March 6, 1928.  1,661,979

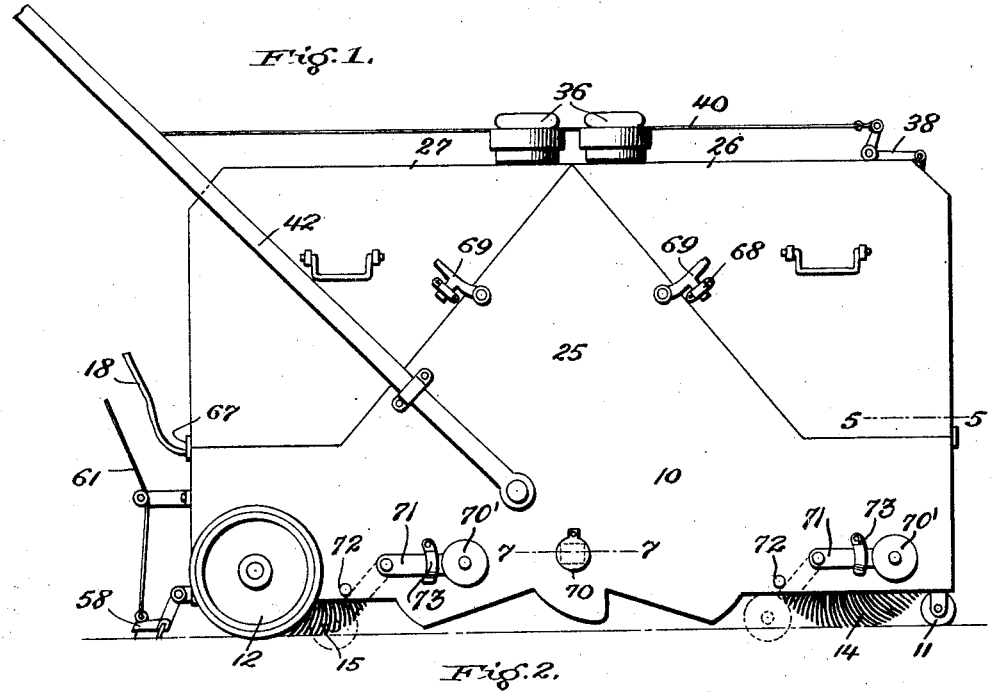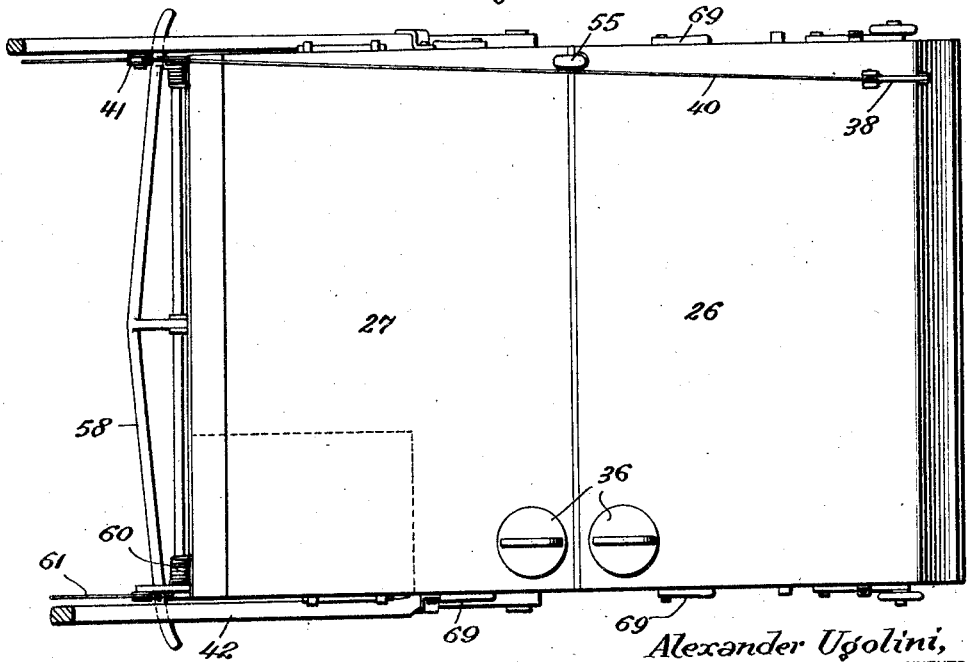

A. UGOLINI

ELECTRICAL SCRUBBING AND DRYING MACHINE

Filed Aug. 20, 1924  3 Sheets-Sheet 2

Alexander Ugolini, INVENTOR

BY Victor J. Evans
ATTORNEY

WITNESS:

March 6, 1928. 1,661,979
A. UGOLINI
ELECTRICAL SCRUBBING AND DRYING MACHINE
Filed Aug. 20, 1924 3 Sheets-Sheet 3

Alexander Ugolini,
INVENTOR

BY Victor J. Evans
ATTORNEY

WITNESS: Gerald Hennessy

Patented Mar. 6, 1928.

1,661,979

UNITED STATES PATENT OFFICE.

ALEXANDER UGOLINI, OF YOUNGSTOWN, OHIO.

ELECTRICAL SCRUBBING AND DRYING MACHINE.

Application filed August 20, 1924. Serial No. 733,167.

This invention relates to improvements in scrubbing machines and has for an object the provision of a simple and durable motor operated scrubbing machine which may be readily and conveniently manipulated and which will thoroughly and effectually cleanse the surface over which it is operated.

Another object of the invention is the provision of a machine of the above character which includes removable fresh and waste water tanks or receptacles which form a part of the machine housing, so that when the said receptacles are removed access may be conveniently had to the interior of the machine.

Another object of the invention is the provision of novel means for collecting waste water from the brushes and conveying the said water to the waste water tank.

With the above and other objects in view, the invention further includes the following novel features and details of construction, to be hereinafter more fully described, illustrated in the accompanying drawings and pointed out in the appended claim.

In the drawings:—

Figure 1 is a side elevation of a scrubbing machine constructed in accordance with the invention.

Figure 2 is a top plan view of the same.

Figure 3:
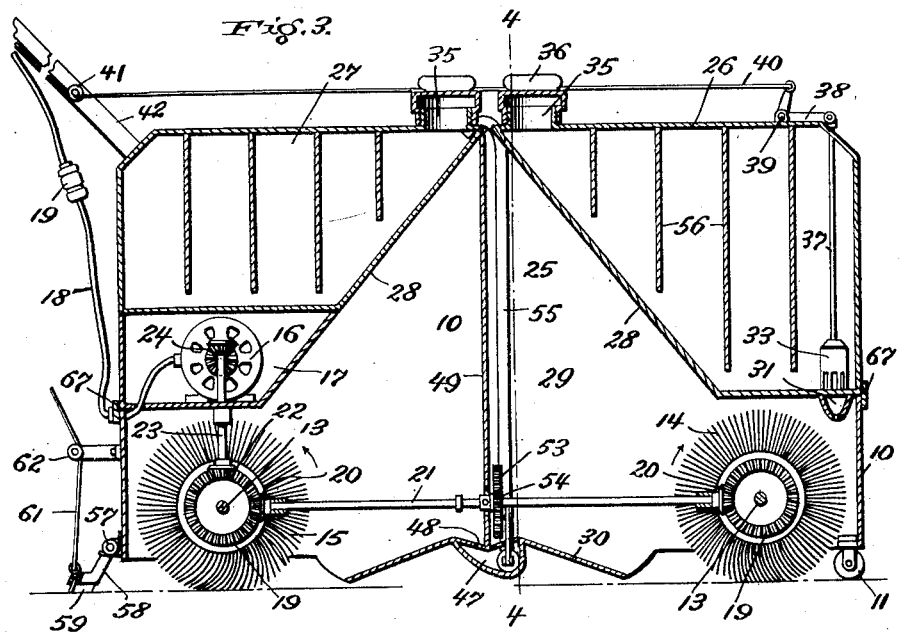
Figure 3 is a central vertical sectional view.
Figure 4:
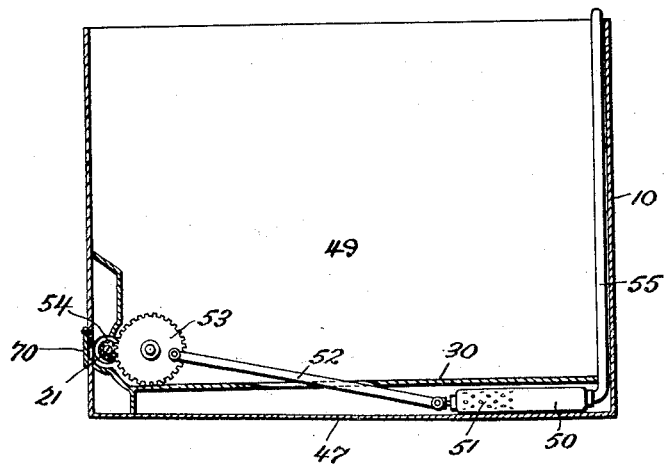
Figure 4 is a section on the line 4—4 of Figure 3.
Figure 6:
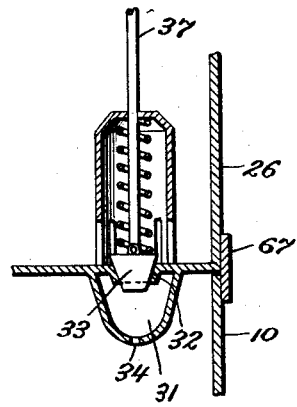
Figure 6 is an enlarged fragmentary section on the line 6—6 of Figure 5.
Figure 5:
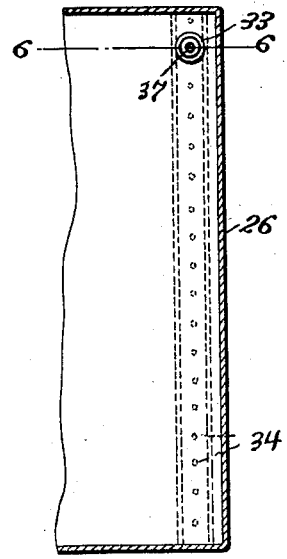
Figure 5 is a detail section on the line 5—5 of Figure 1.
Figure 7:
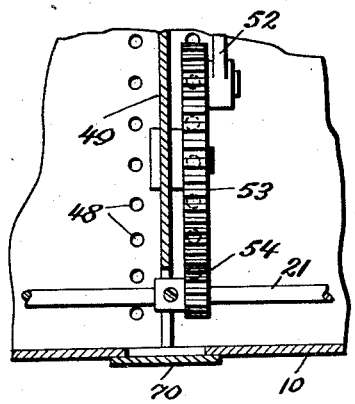
Figure 7 is a similar view on the line 7—7 of Figure 1.
Figure 8:
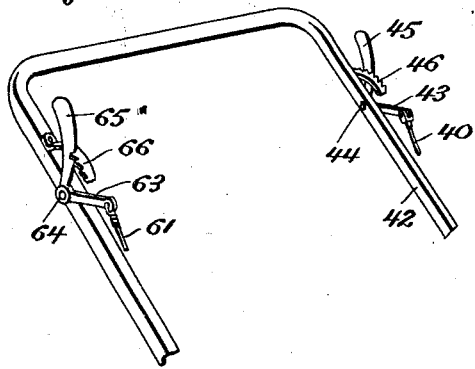
Figure 8 is a fragmentary perspective view of a portion of the handle of the machine and showing the operating levers carried thereby.

Referring to the drawings in detail wherein like characters of reference denote corresponding parts, the reference character 10 indicates the machine housing which includes side walls and end walls. The front end of this housing is supported upon rollers or casters 11, while the rear end is supported upon wheels 12.

Mounted transversely at opposite ends of the housing 10 upon axles 13 are brushes 14 and 15, the former being termed the scouring brush in that it receives the water or other cleansing agent and acts to loosen the dirt, while the brush 15 is termed the gathering brush in that it gathers up surplus water from the scrubbed or scoured surface.

The brushes are motor driven and for this purpose there is provided an electric motor 16 which is mounted within a motor compartment 17 and to which current may be supplied by a conductor wire or cord 18. The latter may have included therein a suitable controlling switch 19. Mounted upon the axles 13 and rigid with the brushes 14 and 15 are beveled gears 19 which are engaged by beveled pinions 20 secured to opposite ends of a shaft 21 which extends along one side of the housing 10 and which is rotatable in suitable bearings. The gear 19 of the brush 15 is driven by a pinion 22 which is secured to one end of a shaft 23 and this shaft is in turn driven by a gear connection 24 with the shaft of the motor 16. The brushes 14 and 15 will thus be rotated in opposite directions or in the direction indicated by the arrows in Figure 3.

The side walls of the housing 10 are provided with upwardly extending inverted substantially V-shaped projections 25 while mounted upon the housing and engaging the opposite inclined edges of the side walls 25 are tanks 26 and 27. The bottoms of these tanks form the top wall of the housing and the space between the inclined bottom walls 28 of the tanks provides a water collecting chamber 29 whose opposite ends are open to the brushes 14 and 15. The chamber 29 is provided with a bottom wall 30.

The tank 26 provides a fresh water tank having a transversely extending channel or gutter 31 extending along the bottom thereof. This channel or gutter is in communication with the tank 26 by means of a port 32 which is controlled by a spring seated valve 33. The channel or gutter is provided with spaced openings 34 so that water entering this channel or gutter will be distributed transversely of the machine upon the forward portion of the brush 14. The tanks 26 and 27 are provided with openings 35 which are normally closed by caps 36.

The valve 33 has extending therefrom a stem 37 whose upper end is connected to one arm of a bell crank lever 38. This lever is pivotally mounted upon the tank 36 as shown at 39 and has connected to its other arm one end of a cable 40. This cable extends rearwardly over the top of the machine around a pulley 41, the said pulley being mounted upon a handle 42 which is secured to the machine housing. The opposite end of the cable 40 is connected to an arm 43 which is pivotally mounted upon the handle 42 as shown at 44. This arm has secured thereto an operating handle 45 which engages a toothed segment 46 carried by the handle 42 so that the valve 33 may be opened and held in open position.

Located beneath the water collecting chamber 29 and extending transversely beneath the bottom 20 of the said chamber is a receiving chamber 47. This chamber is provided with an inclined bottom wall so as to direct water received therein to one side of the chamber. Water enters the chamber 47 from the collecting chamber through openings 48 which are located in a depressed portion of the bottom 30 of the water collecting chamber. The water collecting chamber is provided with a vertically disposed centrally arranged splash partition 49, so that water thrown upward into the chamber 29 from the brushes 14 and 15 will strike this wall and pass downward to the depressed portion of the bottom wall 30 and through the openings 48 into the receiving chamber 47. Located within the receiving chamber 47 is a pump 50 which is provided with openings 51 for the passage of water from the chamber 47 into the pump cylinder. The piston of the pump 50 has connected thereto a rod or pitman 52 which is eccentrically connected to a gear 53. This gear is driven by a pinion 54 which is mounted upon the shaft 21 and driven from the motor 16 as previously mentioned. Communicating with one end of the pump 50 is a pipe or conduit 55 which extends upward through the water collecting chamber 29 and has its opposite end extending into the waste water chamber 27. Thus, waste water from the collecting chamber will pass into the receiving chamber and from this last mentioned chamber will be forced upward into the waste water tank through which it may be conveniently removed.

The tanks 26 and 27 are provided with spaced deflecting walls 56.

Pivotally mounted at the rear of the housing 10 as shown at 57 is a wiper element 58. This element includes a rubber or other flexible engaging strip 59 which is yieldingly pressed into engagement with the scrubbed surface by means of springs 60. The element 57 has connected thereto one end of a cable 61 which passes over a roller 62 and which is secured to an arm 63. This arm is pivotally mounted as shown at 64 upon the handle 42 and carries an operating handle 65 which engages a toothed segment 66. By this means the wiper element may be held in elevated position when desired.

The tanks 26 and 27 are removably secured upon the housing 10 and for this purpose their lower edges engage flanges 67 which extend around the housing. The tanks have secured thereto staples or loops 68 which removably receive hooks 69 pivotally secured to the housing.

The housing is provided at one side with an opening to which access may be had to the gears 53 and 54. This opening is normally closed by a pivotally mounted disk or closure 70.

In order to elevate the machine for movement from place to place without contact of the brushes, the housing is provided upon opposite sides with rollers 70'. These rollers are carried by the outer ends of pivotally mounted arms 71 and when moved to the position shown by the dotted lines in Figure 1 of the drawings will elevate the machine to raise the brushes above the surface over which the machine is travelling. Pivotal movement of the arms 71 in one direction is limited by stops 72, while the rollers 70' may be held in raised or inactive position by spring clips 73.

The invention is susceptible of various changes in its form, proportions and minor details of construction and the right is herein reserved to make such changes as properly fall within the scope of the appended claim.

Having described the invention what is claimed is:—

In a scrubbing machine, a wheel supported housing having side walls provided with oppositely located upstanding inverted V-shaped portions spaced from the ends of the housing, waste and fresh water tanks removably mounted upon the housing and having their bottoms and opposed walls shaped to conform to the shape of the side walls of the housing, means connecting the V-shaped portions of the side walls of the housing and the side walls of the tanks to hold the latter in place, a splash partition disposed transversely of the housing and extending downwardly from the apex of the V-shaped portions and dividing the housing into collecting chambers having downwardly and oppositely extending inclined bottoms open at their remote ends, scrubbing and gathering brushes mounted in the open remote portions of the collecting chambers adjacent the lower ends of the inclined bottoms, means to operate the brushes, means for supplying water from the fresh water chamber to the scrubbing brush, a receiving chamber beneath the adjacent ends of the collecting chambers, means adjacent the splash partition to collect and direct the collected water into the receiving chamber and means operatively connected with an element of the brush operating means to lift the water from the receiving chamber and deliver it to the waste water tank.

In testimony whereof I affix my signature.

ALEXANDER UGOLINI.